United States Patent
Greve et al.

(10) Patent No.: US 12,121,035 B2
(45) Date of Patent: Oct. 22, 2024

(54) SINGULATION AND SEPARATION SYSTEM FOR A SHRIMP PROCESSOR

(71) Applicant: Laitram, L.L.C., Harahan, LA (US)

(72) Inventors: Christopher G. Greve, Covington, LA (US); Lars Vedsted, Vadum (DK); Charles L. Borrello, New Orleans, LA (US); Robert S. Lapeyre, New Orleans, LA (US); Charles J. Ledet, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 18/126,581

(22) Filed: Mar. 27, 2023

(65) Prior Publication Data

US 2023/0225340 A1    Jul. 20, 2023

Related U.S. Application Data

(63) Continuation of application No. 17/499,093, filed on Oct. 12, 2021, now Pat. No. 11,632,962, which is a continuation of application No. 16/639,648, filed as application No. PCT/US2018/049323 on Sep. 4, 2018, now Pat. No. 11,632,961.

(60) Provisional application No. 62/554,190, filed on Sep. 5, 2017.

(51) Int. Cl.
    *A22C 29/00*    (2006.01)
    *A22C 29/02*    (2006.01)

(52) U.S. Cl.
    CPC .......... *A22C 29/005* (2013.01); *A22C 29/023* (2013.01)

(58) Field of Classification Search
    CPC ...... A22C 29/005; A22C 29/023; A22C 29/02
    USPC ............................................................. 452/2
    See application file for complete search history.

(56) References Cited

U.S. PATENT DOCUMENTS

| | | | |
|---|---|---|---|
| 3,513,956 A * | 5/1970 | Rayment | B65G 11/163 |
| | | | 193/44 |
| 3,698,038 A | 10/1972 | Jones, Jr. | |
| 3,784,007 A | 1/1974 | Skrmetta | |
| 4,222,153 A | 9/1980 | Schmidt | |
| 4,393,544 A * | 7/1983 | Lapeyre | A22C 29/026 |
| | | | 452/5 |
| 4,487,307 A | 12/1984 | Meissner et al. | |
| 4,766,990 A | 8/1988 | Colombo | |

(Continued)

FOREIGN PATENT DOCUMENTS

| | | |
|---|---|---|
| CN | 102216180 A | 10/2011 |
| IN | 103801520 A | 5/2014 |
| WO | 9526140 A1 | 10/1995 |

OTHER PUBLICATIONS

Second Office Action, CNIPA, Chinese Invention Patent Application No. 2022109624289, dated Sep. 22, 2023.

(Continued)

*Primary Examiner* — Richard T Price, Jr.
(74) *Attorney, Agent, or Firm* — Catherine M. Bishop

(57) ABSTRACT

A separation and singulation system for presenting shrimps or other product individually to a processor. The separation and singulation system includes a divider pan that separates a layer of shrimp into several lanes, a shaker pan that receives the lanes of shrimp and agitates them to separate clumps of shrimp and a flume for providing further singulation and acceleration of the shrimp. The singulated, separated shrimps are then sent to a processor.

19 Claims, 18 Drawing Sheets

(56) References Cited

U.S. PATENT DOCUMENTS

| | | | | |
|---|---|---|---|---|
| 4,947,519 | A | * | 8/1990 | Griffis .................. A22C 29/043 452/19 |
| 5,980,373 | A | * | 11/1999 | Rosow ................. A22C 29/026 452/5 |
| 6,248,010 | B1 | * | 6/2001 | Sirgo .................. A22C 29/026 452/5 |
| 6,655,878 | B1 | | 12/2003 | deVos et al. |
| 7,357,706 | B2 | | 4/2008 | Hansen |
| 7,811,157 | B1 | * | 10/2010 | Wimberly, Jr. ...... A22C 29/026 452/5 |
| 8,177,609 | B2 | | 5/2012 | Andersen |
| 9,456,617 | B2 | * | 10/2016 | Rau ..................... A22C 29/022 |
| 9,840,376 | B2 | | 12/2017 | White et al. |
| 2005/0186893 | A1 | | 8/2005 | Hulin |
| 2013/0341257 | A1 | | 12/2013 | Greve |
| 2014/0131172 | A1 | | 5/2014 | Greve |
| 2014/0168411 | A1 | | 6/2014 | Ledet et al. |
| 2014/0187132 | A1 | * | 7/2014 | Rau ..................... A22C 29/022 452/3 |
| 2015/0044952 | A1 | | 2/2015 | Vedsted |
| 2016/0183542 | A1 | | 6/2016 | Fogarty |
| 2016/0232656 | A1 | | 8/2016 | Taylor et al. |
| 2016/0309728 | A1 | | 10/2016 | Ledet et al. |

OTHER PUBLICATIONS

New Technology of Aquatic Product Processing, published Dec. 31, 1995.

First Office Action, CNIPA, Chinese Invention Patent Application No. 2022109624289, dated Mar. 13, 2023.

First Office Action of the China National Intellectual Property Administration, Chinese Invention Patent Application No. 2018800545809, mailed Jun. 1, 2021.

Extended European Search Report, European Patent Application No. 18853723.7, mailed Jul. 21, 2021, European Patent Office, Munich, Germany.

* cited by examiner

SINGULATION AND SEPARATION SYSTEM FOR A SHRIMP PROCESSOR

RELATED APPLICATIONS

The present application is a continuation of U.S. patent application Ser. No. 17/499,093, filed Oct. 12, 2021, and entitled "Singulation and Separation System for a Shrimp Processor", which is a continuation of U.S. patent application Ser. No. 16/639,648, filed Feb. 17, 2020, and entitled "Singulation and Separation System for a Shrimp Processor", which is a § 371 application of PCT/US2018/049323, which claims priority to U.S. Provisional Patent Application Ser. No. 62/554,190, filed Sep. 5, 2017, entitled "Singulation and Separation System for a Shrimp Processor", the contents of which are herein incorporated by reference.

BACKGROUND OF THE INVENTION

The invention relates generally to shrimp processing, in particular the singulating and separating of shrimp before subsequent processing.

Shrimp processors sort shrimp by weight because larger shrimp can be sold at a higher price than smaller shrimp. Grading, sorting or other processing systems may require shrimp to be singulated and separated prior to processing. Because shrimps, especially peeled shrimps, are wet and somewhat sticky, they tend to adhere to each other. Touching or piggy-backed shrimps can cause problems for subsequent processes, such as vision grading. Other products may also require separation and singulation prior to a process, such as grading.

SUMMARY OF THE INVENTION

One version of an apparatus embodying features of the invention for separation and singulating a batch of a product comprises a divider pan that separates a layer of product into several lanes of product, a shaker pan that receives the lanes of product and agitates them to separate clumps of product and a flume for providing further singulation and acceleration of the individual product. The singulated, separated objects are then sent to a processor, such as a grader.

According to one aspect, an apparatus for singulating a batch of a product comprises a conveyor for conveying the product, a divider pan positioned below an outfeed end of the conveyor for receiving the product and dividing the product into a plurality of lanes of product and a plurality of flumes positioned to receive the plurality of lanes of product. The flumes provide a flow of water to accelerate the product to separate and singulate the product.

According to another aspect, an apparatus for singulating a batch of a product comprises a conveyor for conveying the product, a divider pan positioned below an outfeed end of the conveyor for receiving the product and dividing the product into a plurality of lanes of product and a plurality of flumes positioned to receive the plurality of lanes of product. The flumes accelerate the product to separate and singulate the product. The divider pan comprises an angled back wall, a plurality of upper dividing walls on the angled back wall forming upper channels and a plurality of lower dividing walls below the upper dividing walls forming lower channels.

According to another aspect, an apparatus for singulating a batch of a product comprises a conveyor for conveying the product, a divider pan positioned below an outfeed end of the conveyor for receiving the product and dividing the product into a plurality of lanes of products and a plurality of flumes positioned to receive the plurality of lanes of product. Each flume comprises a first channel extending downwards and having a water nozzle forming a back wall of the first channel providing a fluid to carry the product.

DETAILED DESCRIPTION

The invention will be described below relative to certain illustrative embodiments, though the invention is not limited to the illustrative embodiments. For example, the separation and singulation system is not limited to shrimp, but can be used to separate and singulate any suitable product prior to further processing.

Figure 1:
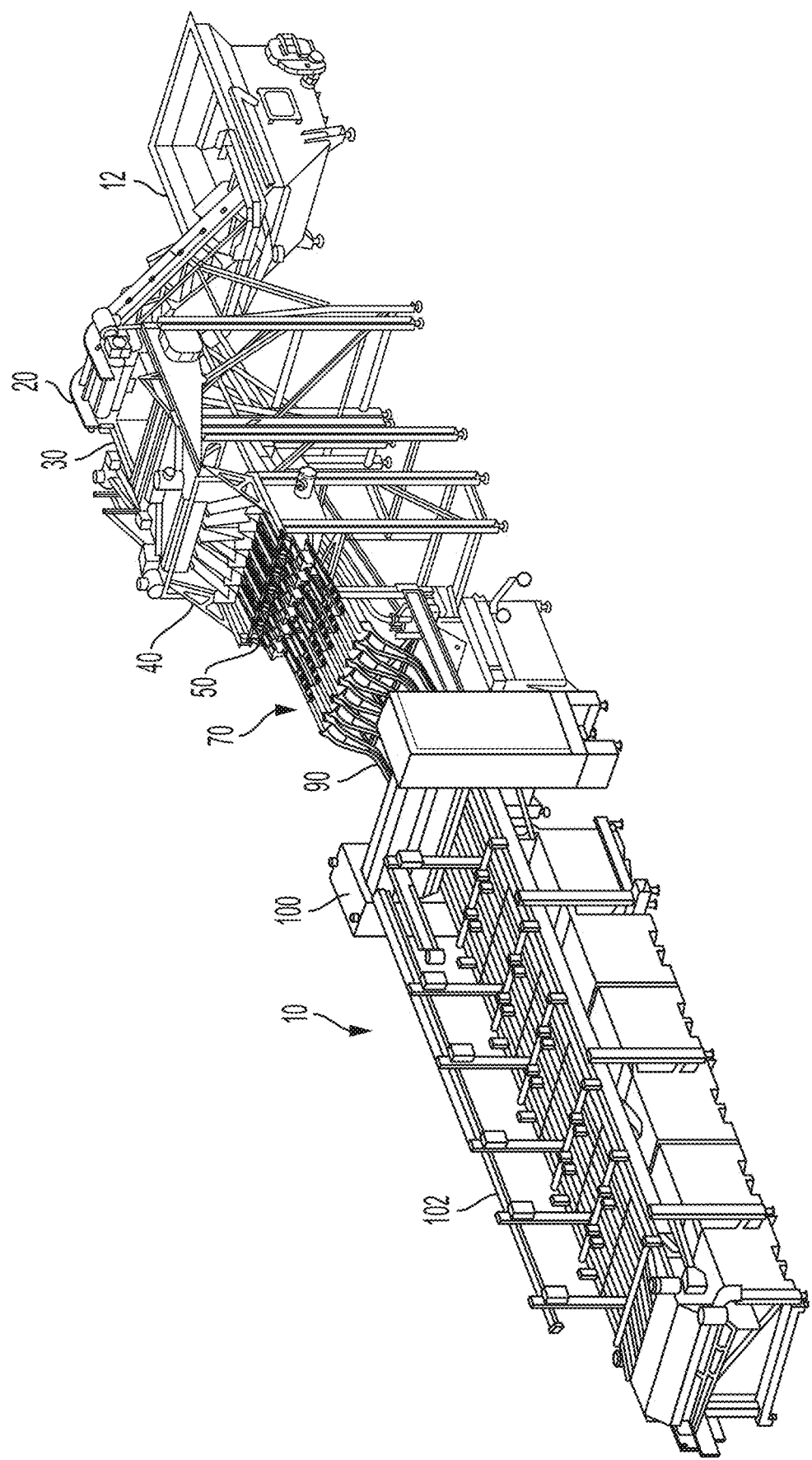
FIG. 1 is an isometric view of a shrimp processing system including a singulation and separation section according to an embodiment of the invention.
Figure 2:
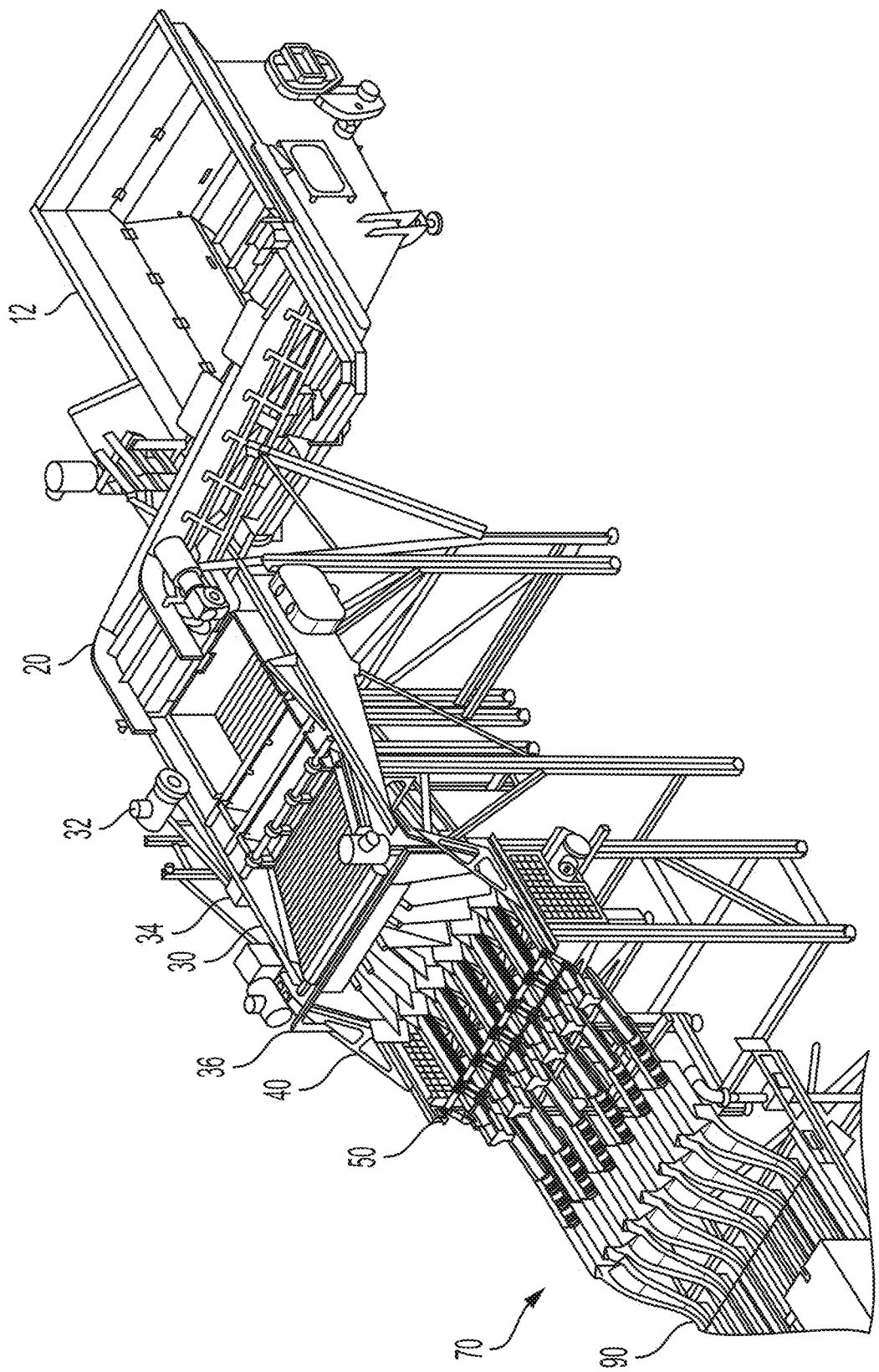
FIG. 2 is a close-up view of the singulation and separation section of the system of FIG. 1.
Figure 3:
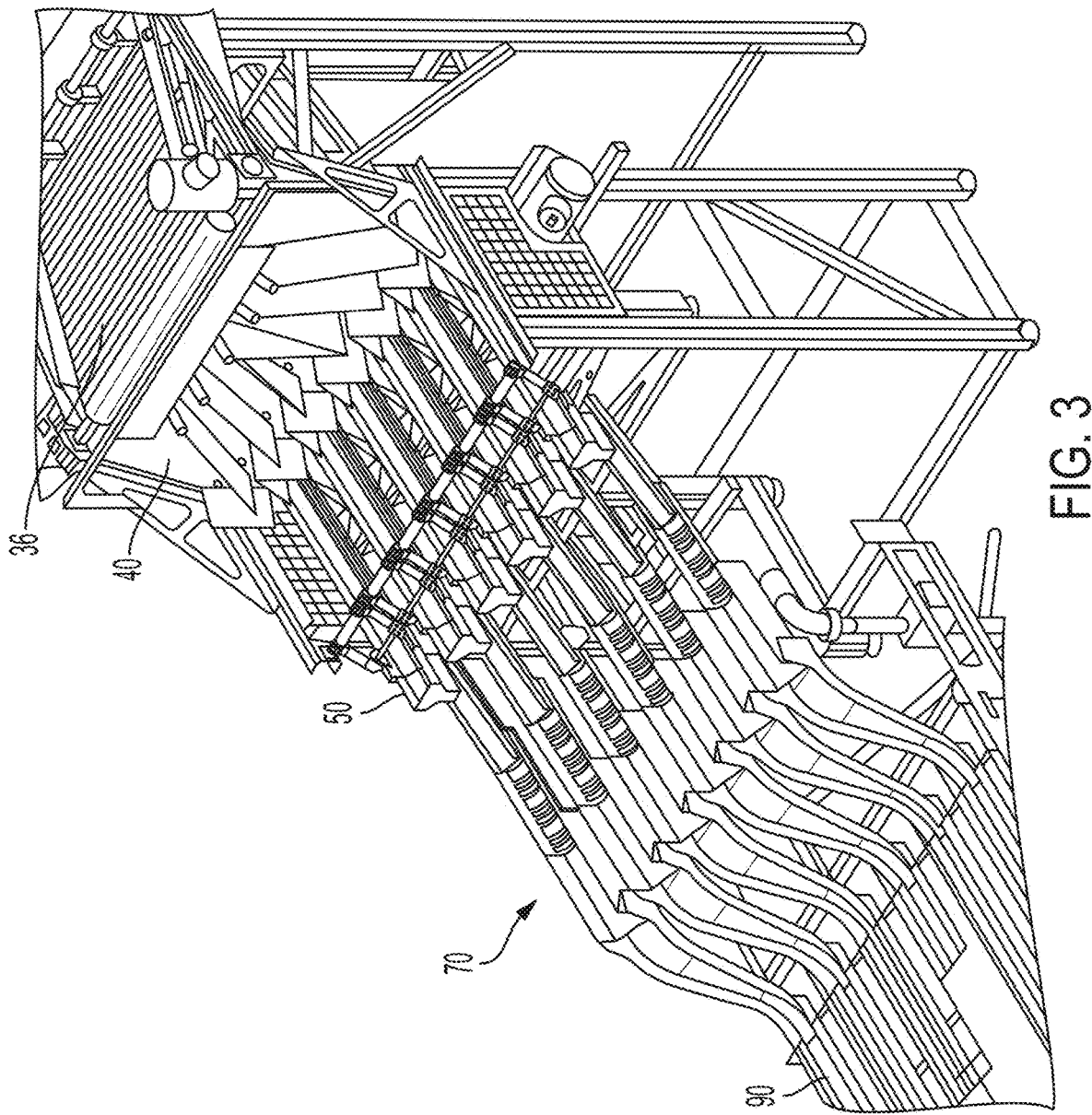
FIG. 3 is another view of the singulation and separation section of the system of FIG. 2.

A shrimp processing system embodying features of the invention is shown in FIG. 1. A shrimp singulation and separation portion of the overall system is shown in FIGS. 2 and 3. The illustrative shrimp processing system 10 includes a bulk feed tank 12 for holding a batch of shrimp or other product to be processed. A flighted, inclined conveyor belt 20 pulls shrimp out of the bulk feed tank 12. The shrimp fall off the outfeed end of the flighted, inclined conveyor belt into a secondary feed tank 30, which distributes shrimp on an inclined conveyor belt 36 to prepare for singulation.

The secondary feed tank 30 may include an oscillating paddle 32 and a plunging paddle 34 to facilitate the distribution of a single layer of shrimp on the inclined conveyor belt 36. The inclined conveyor belt 36 may be inclined at any suitable angle, preferably between about 10° and about 20° from horizontal, though the invention is not so limited. An example of an oscillating paddle 32 can be found in U.S. Pat. No. RE34646, the contents of which are herein incorporated by reference. An example of a suitable plunging paddle 34 can be found in U.S. Pat. No. 9,132,969, the contents of which are herein incorporated by reference. The oscillating paddle 32 creates a wave-like motion to spread the product out onto the inclined conveyor belt 36, while the plunging paddle 34 creates a single, even layer of the product on the inclined conveyor belt 36.

From the secondary feed tank 30, the inclined conveyor belt 36 delivers the evenly-distributed shrimp (or other product) to a divider pan 40, which divides the layer of shrimp into several lanes of shrimp. A shaker pan 50 receives the divided shrimp and spreads the shrimp out at a steady feeding rate.

The shaker pan 50 delivers the divided and spread-out shrimp into an array of flumes 70, which further singulate and separate the shrimp before passing the shrimp onto an optional dewatering conveyor 90. The dewatering conveyor 90 drains water from the shrimp and transfers the singulated, separated and dewatered shrimp to a processor, which in the illustrative embodiment, is a visioning system for grading the shrimp, but the invention not so limited.

The illustrative visioning station 100 captures images of each shrimp and digitizes the images into digital images of each shrimp. In the illustrative embodiment, the visioning system 100 is used for grading the shrimp in a subsequent grading station 102, though the invention is not limited to the illustrative process.

Figure 4:
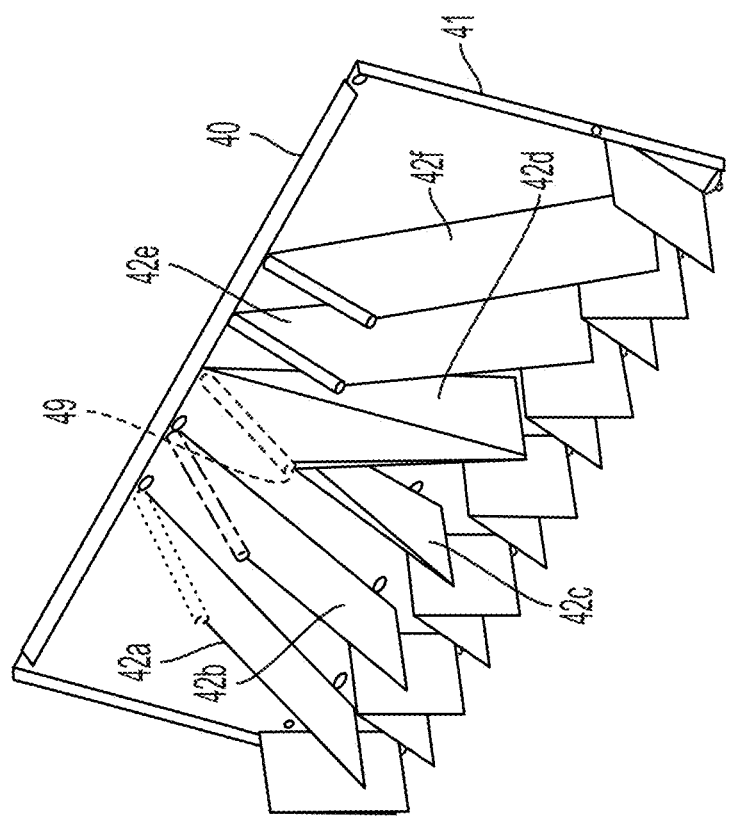
FIG. 4 is an isometric view of a divider pan in the system of FIG. 1.
Figure 5:
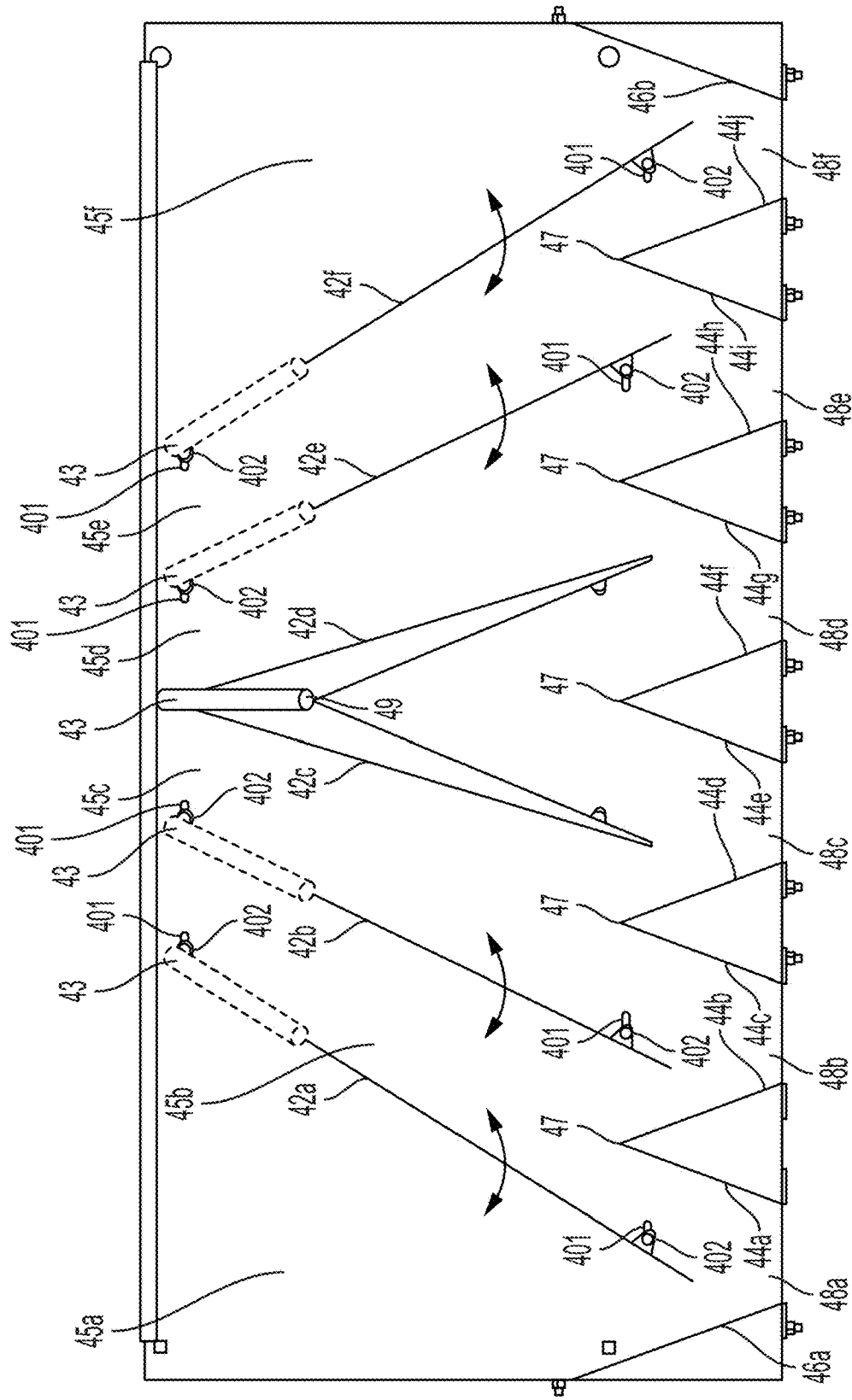
FIG. 5 is a front view of the divider pan of FIG. 4.
Figure 6:
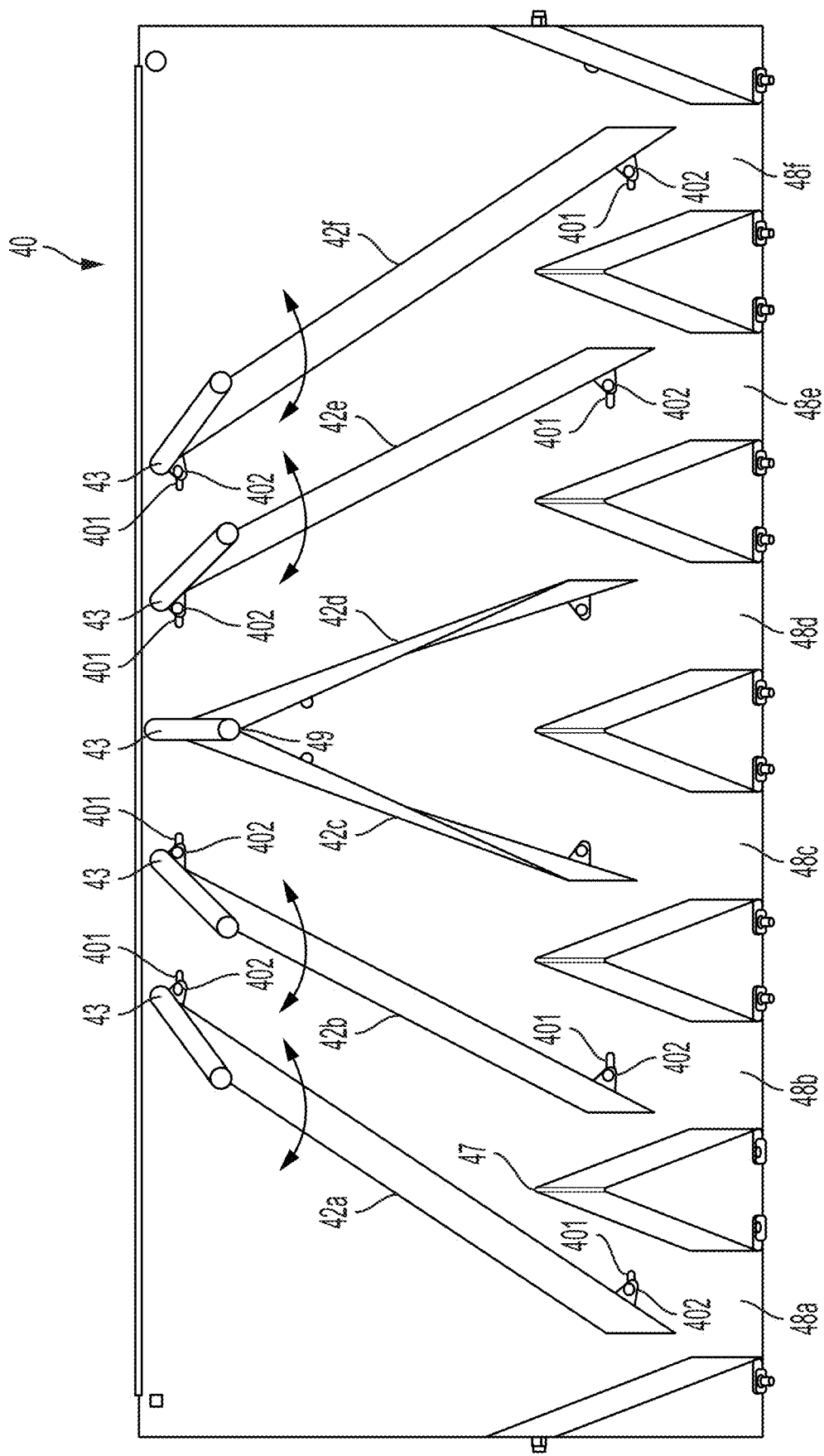
FIG. 6 is another view of the divider pan of FIG. 4.
Figure 7:
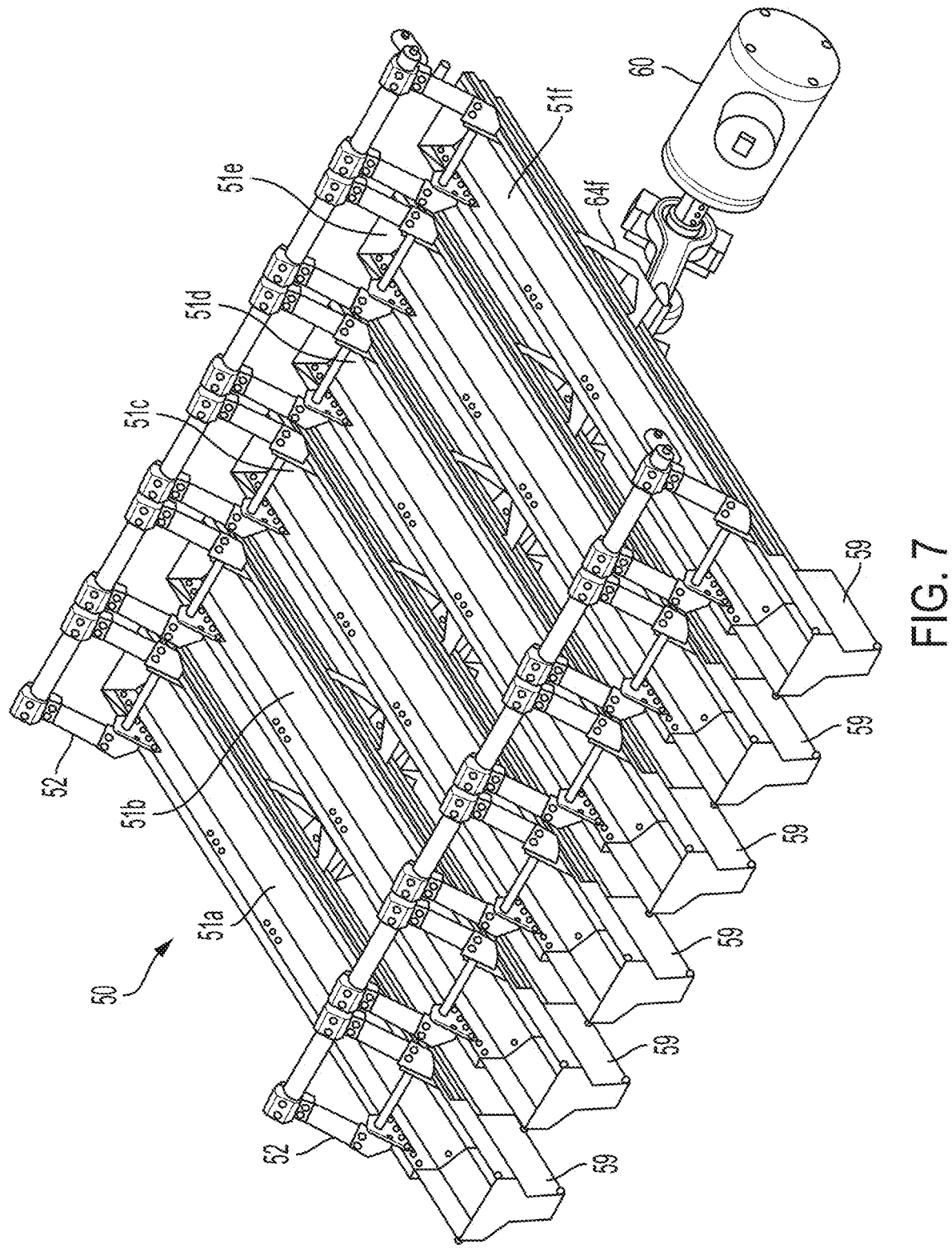
FIG. 7 is an isometric view of the shaker pan in the system of FIG. 1.
Figure 8:
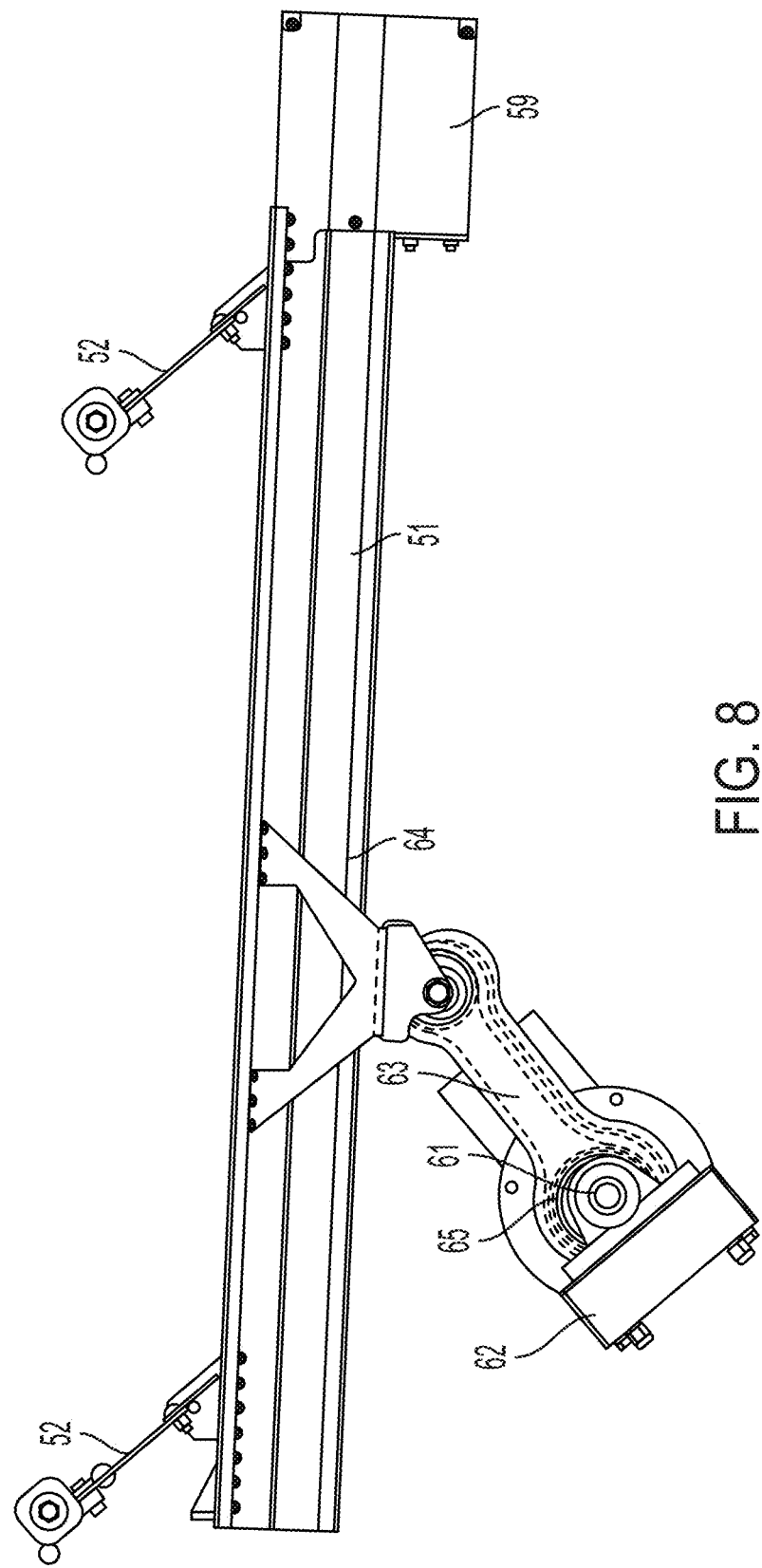
FIG. 8 is a side view of the shaker pan of FIG. 7.
Figure 9:
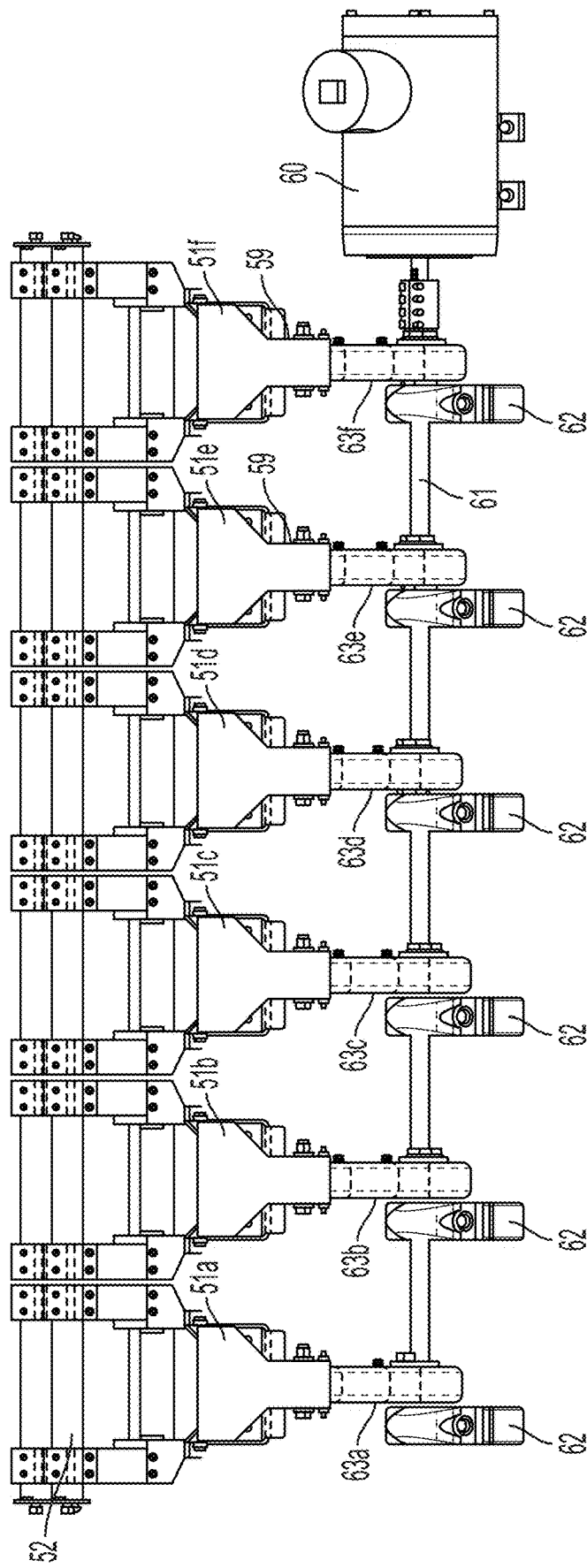
FIG. 9 is an end view of the shaker pan of FIG. 7.

Referring to FIGS. 4-6, the divider pan 40, which may be formed of sheet metal or another suitable material, includes a back wall 41 extending down from the outfeed end of the secondary feed tank 30. The illustrative back wall 41 extends from the outfeed end of the inclined conveyor belt 36 of the secondary feed tank 30 at an angle of between 10° and about 20° from vertical, though the invention is not so limited. The divider pan 40 includes upper dividing walls 42a-42f extending from a front face of the back wall 41 forming diverging channels 45a-f and lower dividing walls 46a-b and 44a-j forming converging channels 48a-f.

The upper dividing walls 42a-42f fan out, with central upper dividing walls 42c and 42d converging to a central top point 49. The upper dividing walls 42a-42f may manually be adjustable using mounting slots 401 in the back wall 41 and fasteners 402 at the top and-or bottom of one or more of the upper dividing walls. The fasteners 402 may be loosened and slid to a select position in the mounting slot 401, then tightened to set the position of the associated upper dividing wall. Any suitable means for adjusting the walls may be used and the invention is not limited to the illustrative embodiment.

The lower dividing walls include angled edge walls 46a, 46b that slant down and towards the middle of the plate and angled middle walls 44a-44j that alternate in orientation. Adjacent middle walls converge at top points 47 to form A-frame channel dividers defining the sides of the converging channels 48. Falling shrimp from an upper diverging channel 45 is directed into a converging channel 48 below. Any suitable means for forming the converging channels 48 may be used, and the invention is not limited to the illustrative structures. In the illustrative embodiment, the lower edges of the upper dividing walls 42 extend into the lower converging channels 48, but the invention is not so limited.

From the lower converging channels 48, the shrimp fall into associated channels of the shaker pan 50.

A rounded guide bar 43 tops each upper dividing wall 42, with middle walls 42c, 42d sharing a rounded guide bar 43. The rounded guide bars 43 extend down at an angle of between about 30° and about 50° and preferably between about 35° and about 45° from horizontal to prevent product from becoming stuck as it tumbles from the secondary feed tank 30.

Preferably, the divider pan 40 is formed of a low-friction material, such as a dimpled or quilted metal. An example of a suitable material is Rimex type 7GM® material, though the invention is not limited. The material can be coated in Teflon® or another similar material to further reduce friction.

The illustrative divider pan 40 evenly divides product into multiple independent lanes at a steady flow rate. Product is directed from the lower channels 48 into the shaker pan 50.

Figure 10:
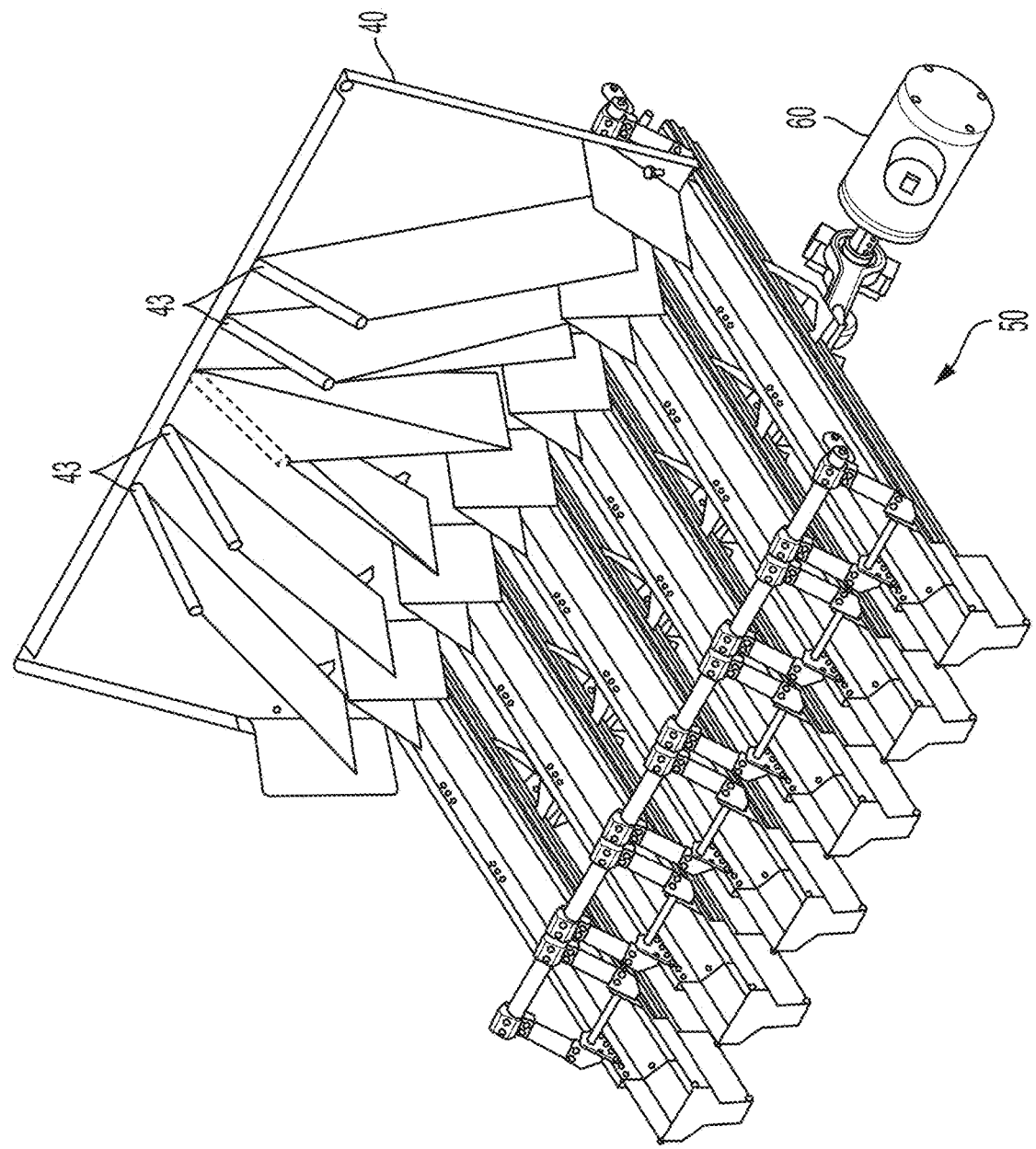
FIG. 10 is an isometric view of the shaker pan and divider pan combination.
Figure 11:
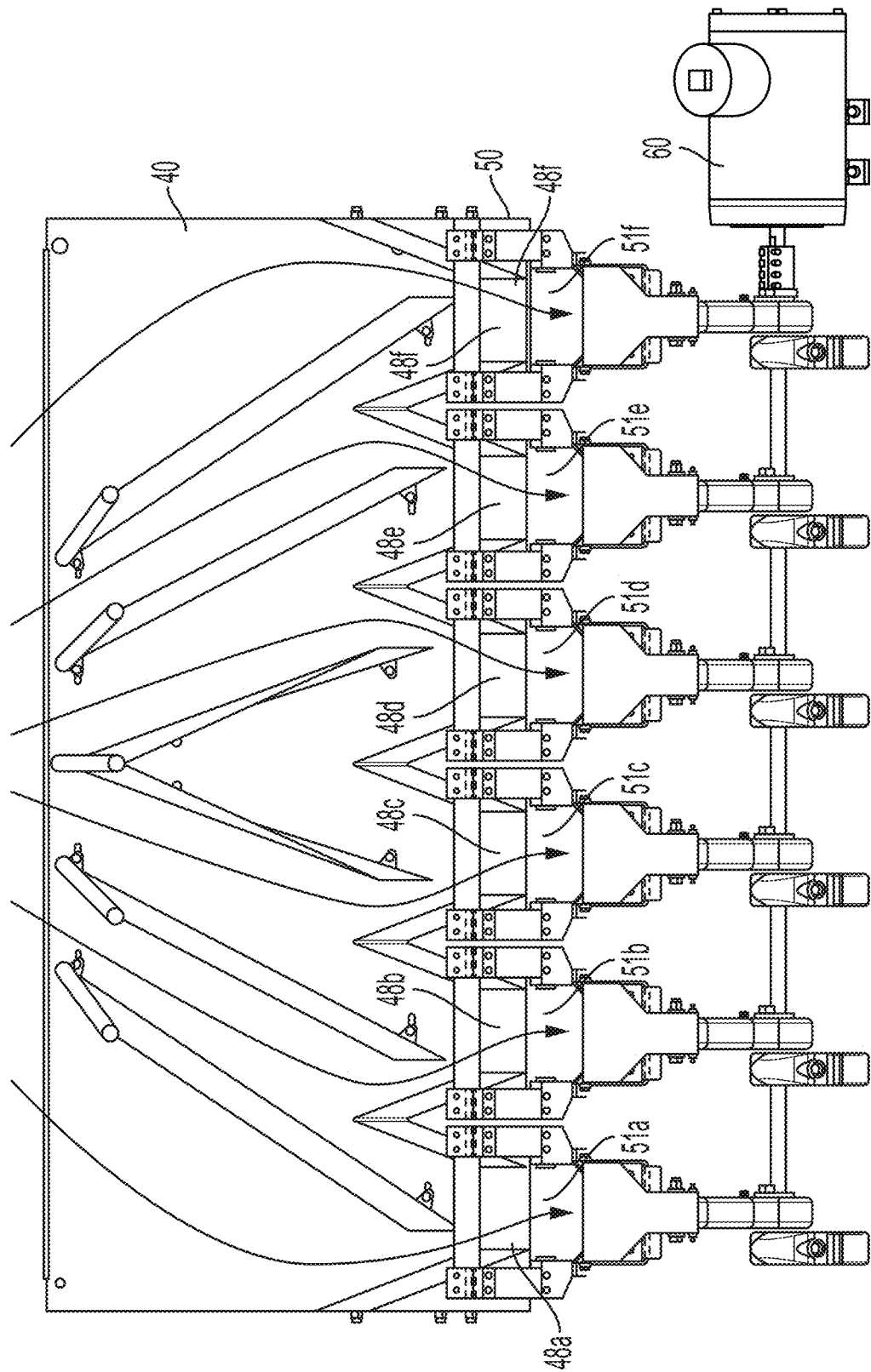
FIG. 11 is a front view of the combination of FIG. 10.

Referring to FIGS. 7-11, the shaker pan 50 receives shrimp from the lower channels 48 of divider pan 40 and agitates the shrimp to declump them, shaking the product one-by-one onto the flumes 70. The illustrative shaker pan comprises six channels 51a-f, each positioned to receive product from an aligned divider pan lower channel 48, as shown in FIGS. 10 and 11. Each shaker pan channel 51 comprises a substantially flat bottom extending downwards at an angle of between about 5° and about 20° from horizontal, though the invention is not so limited. The side walls of the channels 51 slant outwards and widen towards the top. The shaker pan 50 includes flexible connectors 52 for mounting the channels 51 to a frame. The illustrative connectors 52 are above the channels 51, but the invention is not so limited. For example, the connectors could be below the channels or have another configuration and-or location.

An actuator shakes the channels 51a-51f to separate shrimp traveling through the channels. The illustrative actuator comprises a motor 60 that rotates a shaft 61. The shaft 61 passes through shaft supports 62. Shaft-channel connectors 63 connects the shaft 61 to the channels 51 to translate motion of the shaft 61 to shaking of the channels 51. Each shaft-channel connector 63 includes an opening at a first end for receiving the shaft 61 and an opening at a second end that connects to a bracket 64 mounted to the bottom of an associated channel 51. When the motor 60 rotates the shaft 61, the connectors 63 translate the motion into a shaking action on the shaker pan.

The illustrative shaker pan 50 is inherently balanced. For example, in one embodiment, each shaft-channel connector 63 includes an eccentric 65 rotatably mounted in the first end opening of the connector 63. The eccentric 65 includes an opening that receives the shaft 61 to connect the shaft 61 to the bracket 64. The shaft opening is offset from the center of the eccentric to cause the connector end to move in a circuit when the shaft 61 is rotated by the motor 60. Each eccentric opening is out-of-phase with the opening of an adjacent eccentric. In one embodiment, first and second eccentrics, associated with connectors 63a, 63b, are 180° out of phase with each other and cancel each other out. A third eccentric, associated with connector 63c, is offset from the second eccentric by 60°, with a fourth eccentric, associated with connector 63d, 180° out of phase with the third eccentric, canceling it out. A fifth eccentric, associated with connector 63e, is 60° offset from the fourth eccentric, and a sixth eccentric, associated with connector 63f, is offset from the fifth eccentric by 180°, canceling it out. This or any other suitable configuration can be used to minimize perturbations.

The shaker pan 50 is designed to shake separated shrimp from each channel 51 onto an associated flume. The end of each channel 51 includes an open bottom that forms a funnel 59 over a top section of an associated flume channel 70 to drop each shrimp onto a flume channel.

The shaker pan 50 is not limited to separate channels, and can comprise an open pan, or another suitable configuration.

Preferably, the shaker pan 50 channels are formed of a low-friction material, such as a dimpled or quilted metal. An example of a suitable material is Rimex type 7GM® material, though the invention is not limited. The material can be coated in Teflon® or another similar material to further reduce friction.

Figure 12:
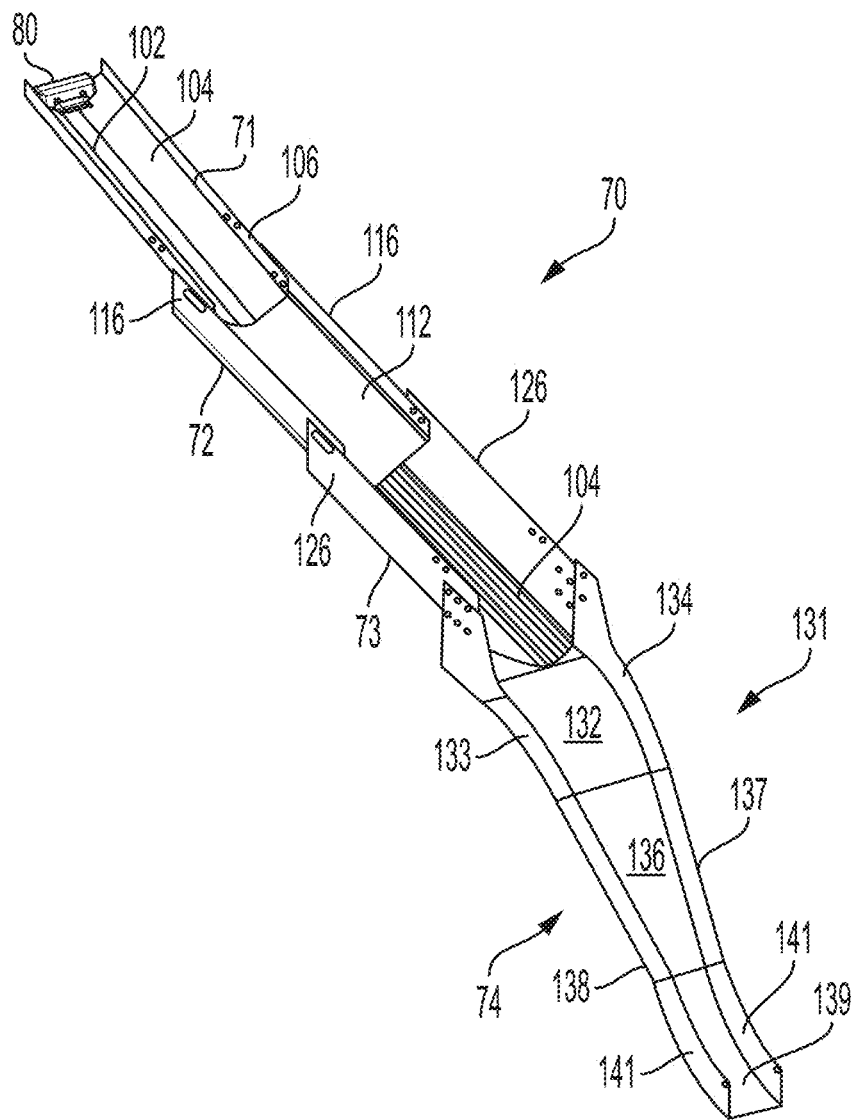
FIG. 12 is an isometric view of a flume channel of FIG. 1.
Figure 13:
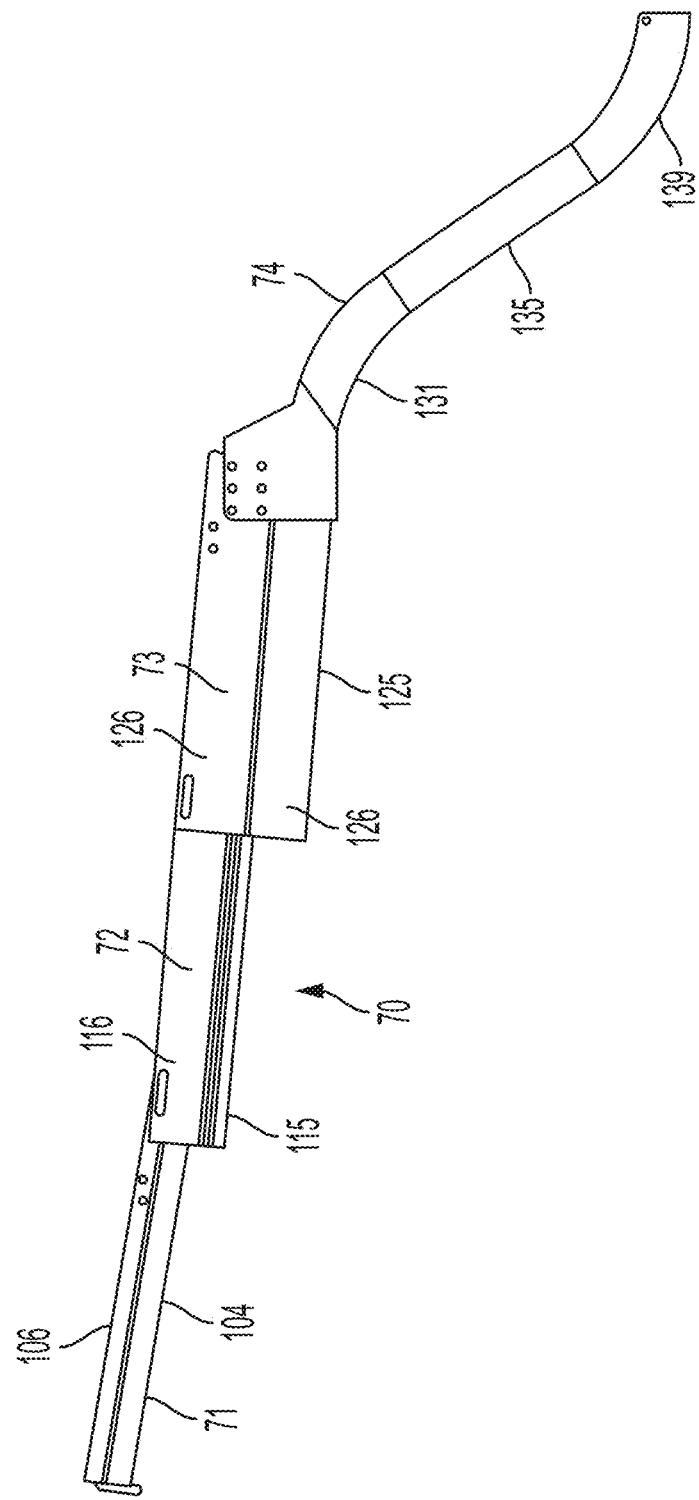
FIG. 13 is a side view of the flume channel of FIG. 12.
Figure 14:
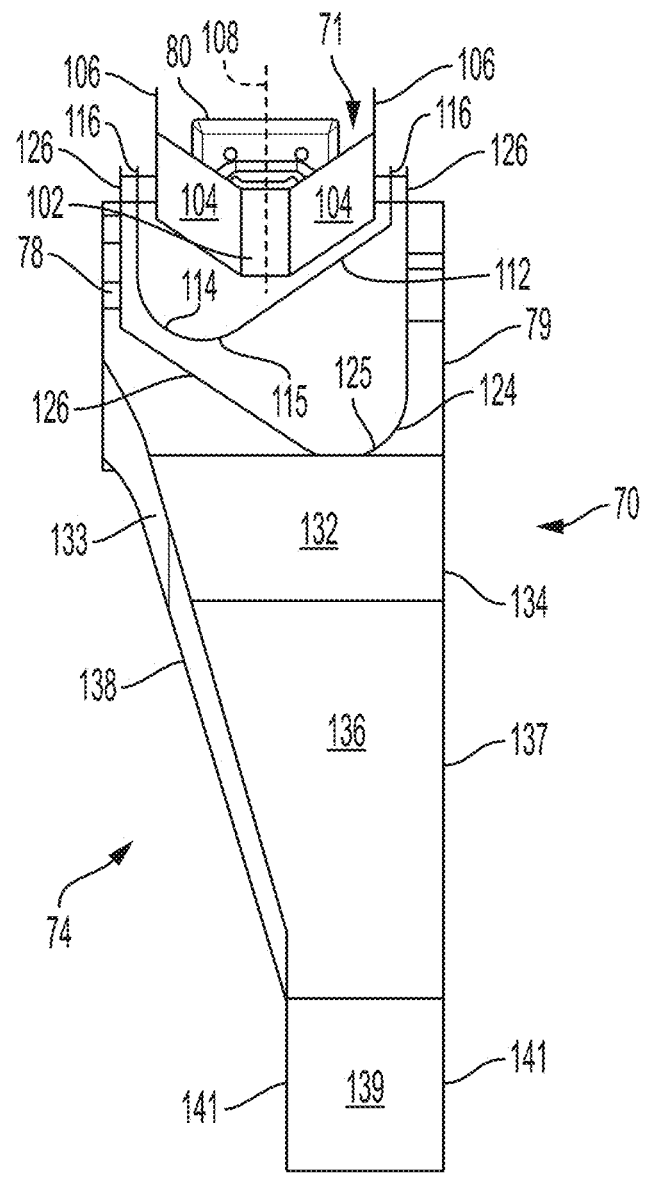
FIG. 14 is a front view of the flume channel of FIG. 12.

FIGS. 12-14 show an embodiment of a flume channel 70 suitable for receiving shrimp or other product from a funnel 59 of the shaker pan 50 or other source, and further singulating the shrimp. Each flume comprises a first, upper flume 71, a second, middle flume 72, a third, lower flume 73 and a narrowing slide 74. The different sections can be coupled through fasteners or any suitable means.

The upper flume 71 slants downwards from the funnel 59 at an angle of between about 5° and about 20° and preferably about 10° from horizontal, and includes a flat bottom wall 102, angled lower side walls 104 that flare out and up and vertical upper side walls 106, though the invention is not so limited. The upper flume 71 is symmetrical about a center line 108 that is half-way between the vertical upper side walls 106.

The upper flume 71 also includes a water nozzle 80 forming a back wall of the flume 71. The water nozzle 80 sprays water or another liquid at a suitable rate to provide a flow of water carrying the shrimp through the flume channel 70. In one embodiment, the nozzle 80 sprays water at a rate of between about 8 and about 12 gallons per minute to feed the bottom of the upper flume 71, though the invention is not so limited.

The second flume 72 is positioned to receive product from the first flume 71. The second flume 72 is offset from the first flume 71 to facilitate further separation of shrimp, i.e., the nadir of the second flume is laterally shifted relative to the nadir of the upper flume, causing the shrimp flowing in water to move to towards one side of the flume. The second flume 72 comprises vertical upper side walls 116 that are wider than the vertical upper side walls 106 of the upper flume 71, a curved, concave wall 114 and an angled side wall 112 that intersects the curved, concave side wall to define the nadir 115 of the channel. The second flume 72 is asymmetric about the lateral center line 108 to force shrimp flow towards one side 78 of the flume channel. The illustrative second flume 72 is angled downwards at an angle of between about 0° and about 15° and preferably about 5° from horizontal, though the invention is not so limited.

The third flume 73 receives shrimp from the second flume 72 and shifts the flow of shrimp towards the second side 79 of the flume channel to provide further separation of shrimp. The third flume 73 is larger than the second flume 72 and includes vertical upper side walls 126 that are wider than the second flume walls 116, a concave, curved wall 124 and an angled wall 126 that intersects the concave, curved wall 124 to define an offset nadir 125 of the channel. The third flume 73 is also asymmetric about the lateral center line 108 to force shrimp towards the opposite side from the second flume 72. The illustrative third flume 73 is angled downwards at an angle of between about 0° and about 15° and preferably about 5° from horizontal, though the invention is not so limited.

The tapering slide 74 is positioned at the outlet of the third flume 73 to receive separated shrimp, accelerate them to provide further separation, and deliver them to a dewatering belt. The tapering slide 74 comprises a wide upper section 131 having a bottom wall 132 that is slightly convex, a first side wall 134 that is substantially straight and a second side wall 133 that may taper from an outer point aligned with the outer wall of the third flume. A narrowing middle section 135 comprises a bottom wall 136 that extends downwards at an angle that is between about 50° and about 60° and preferably about 55° from horizontal and a first side wall 137 aligned with side wall 134 and a second side wall 138 that tapers to narrow the channel formed by the flume 70. At the bottom, the tapering slide 74 comprises a slightly convex portion 139 that deposits shrimp onto the dewatering belt. The illustrative bottom portion 139 has a consistent width, with parallel, vertical side walls 141, but the invention is not so limited.

The illustrative narrowing slide 74 accelerates shrimp or other product received from the shaker pan 50 or other source to a rate of between about 400 and about 500 feet per minute, though the invention is not so limited.

Preferably, the flume components are formed of a low-friction material, such as a dimpled or quilted metal. An example of a suitable material is Rimex type 7GM® material, though the invention is not limited. The material can be coated in Teflon® or another similar material to further reduce friction.

Figure 15:
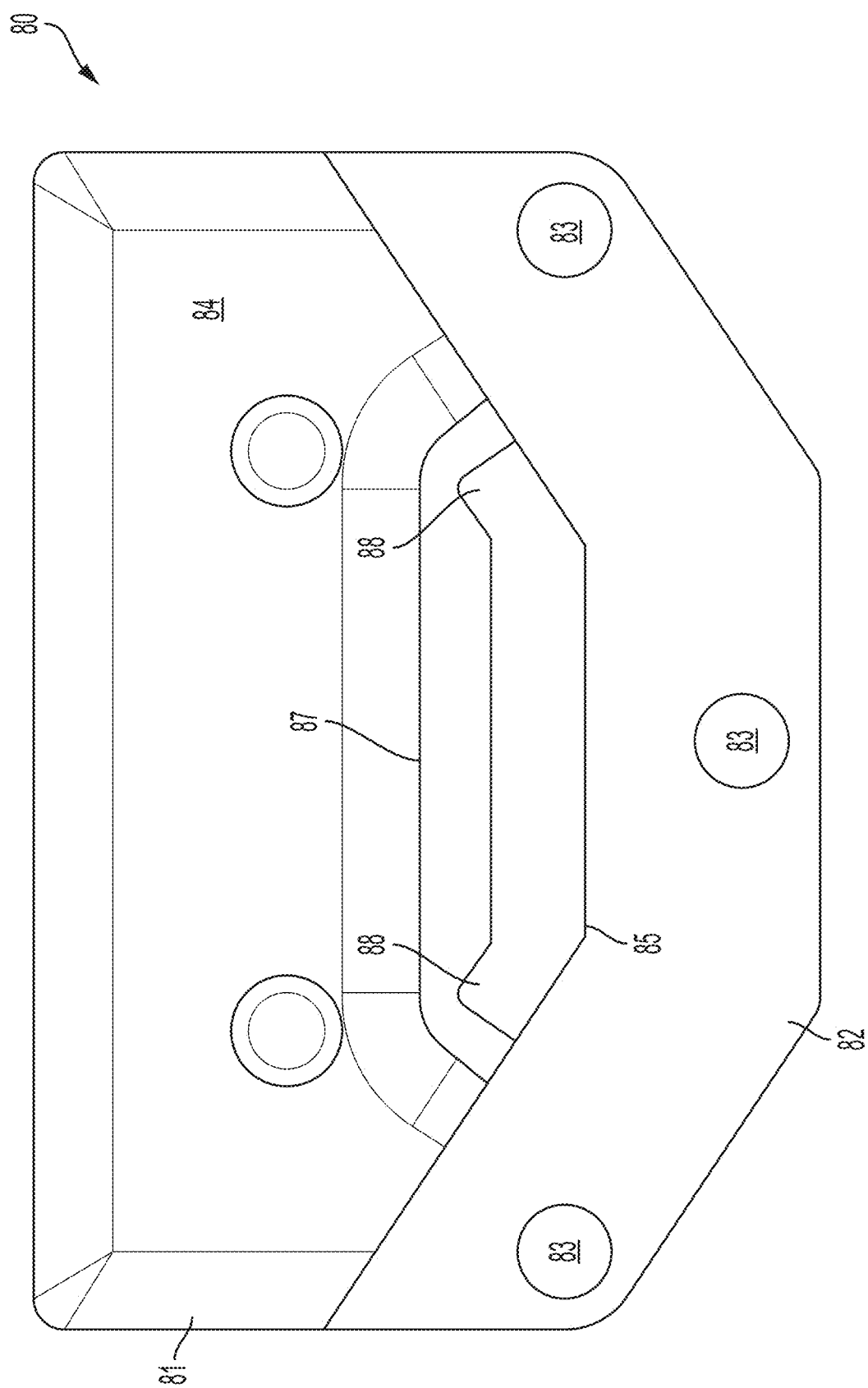
FIG. 15 is a front view of a nozzle in the flume channel of FIG. 12.
Figure 16:
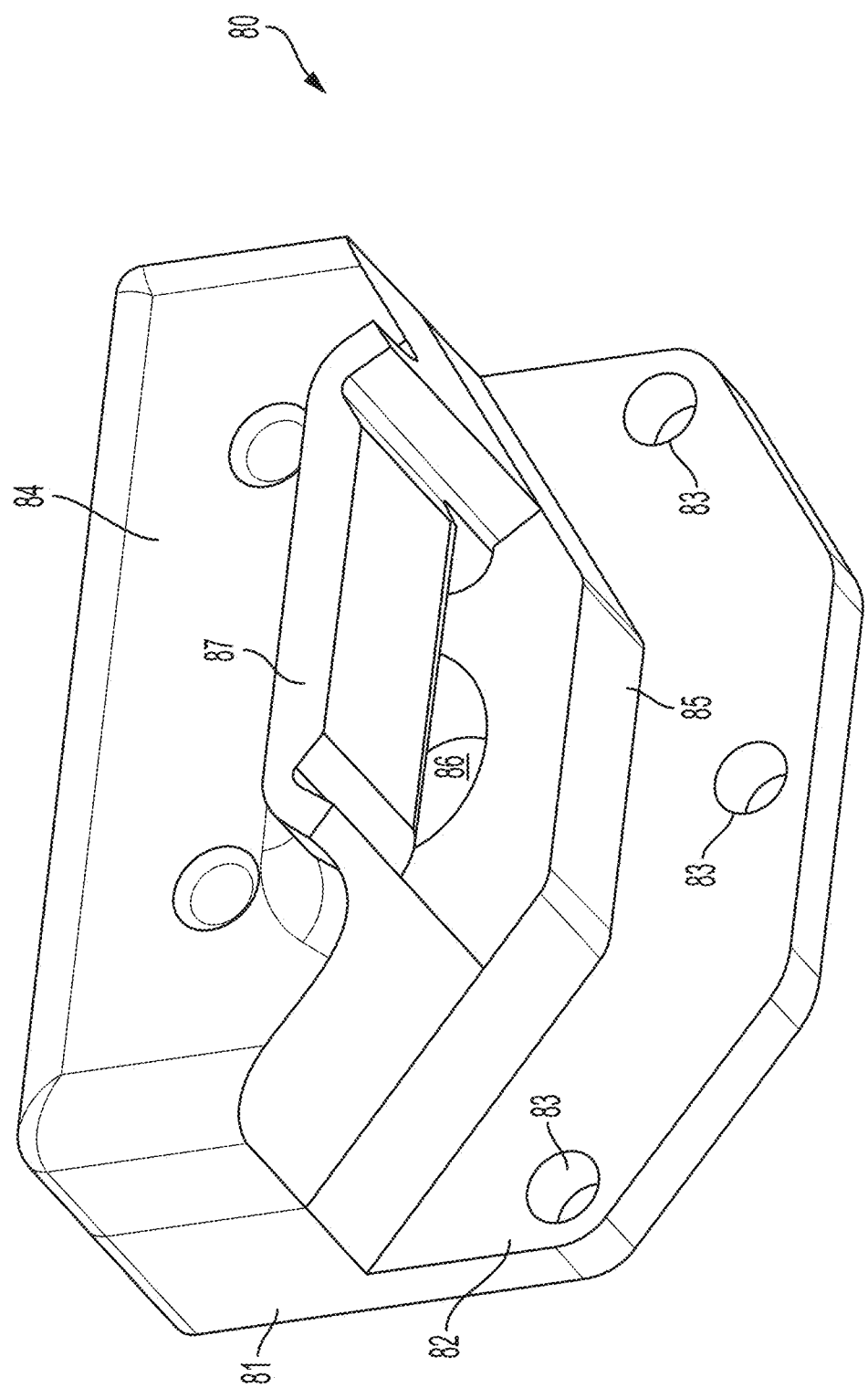
FIG. 16 is an isometric view of the nozzle of FIG. 15.
Figure 17:
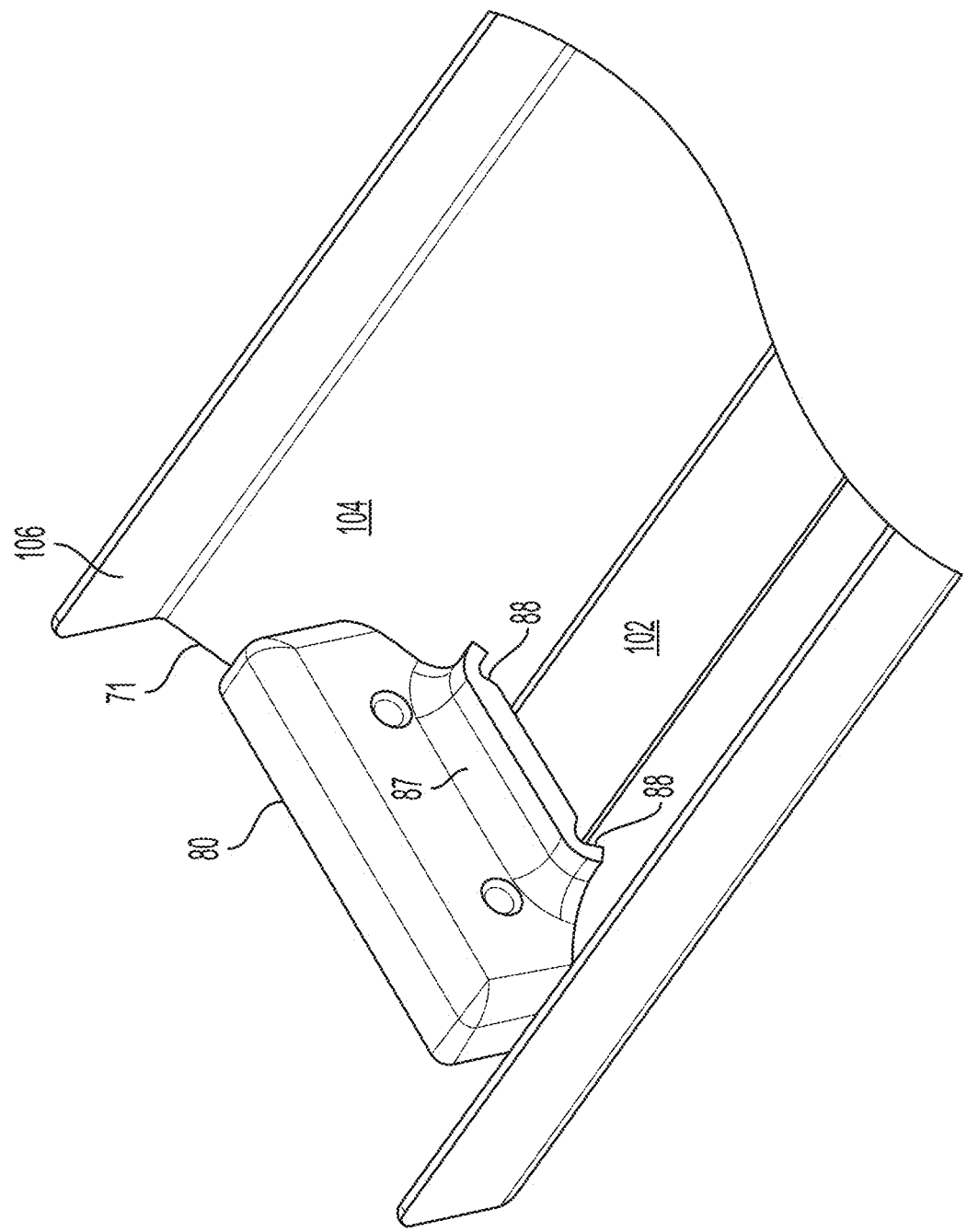
FIG. 17 is an isometric view of the nozzle and a portion of the flume channel according to an embodiment of the invention.

FIGS. 15-17 show an embodiment of a nozzle 80 suitable for producing a water spray used to separate and accelerate shrimp on a slide. The nozzle 80 is placed at the back of the first, upper flume 71 and connected to a water source. The nozzle 80 comprises a base 81 that forms a back wall of the upper flume 71. A tail portion 82 includes one or more openings 83 for connecting the nozzle 80 to the flume and a thickened upper portion 84 has a bottom edge 85 that matches the profile of the upper flume so that the upper portion 84 sits on the flat bottom wall 102 and a portion of the angled side walls 104. A central opening 86 is connected to a water source. A lip 87 extends partially into the first flume 71 to form a channel for directing water provided through the central opening 86. The nozzle 80 provides an even flow of water, spread out over the wall 102. Notches 88 in the lip 87 ensure an even spread of water in the flume 71. The illustrative nozzle is not limited to use in the singulation and separation system 10, but can be used in any system requiring an even spread of water in a channel.

Figure 18:
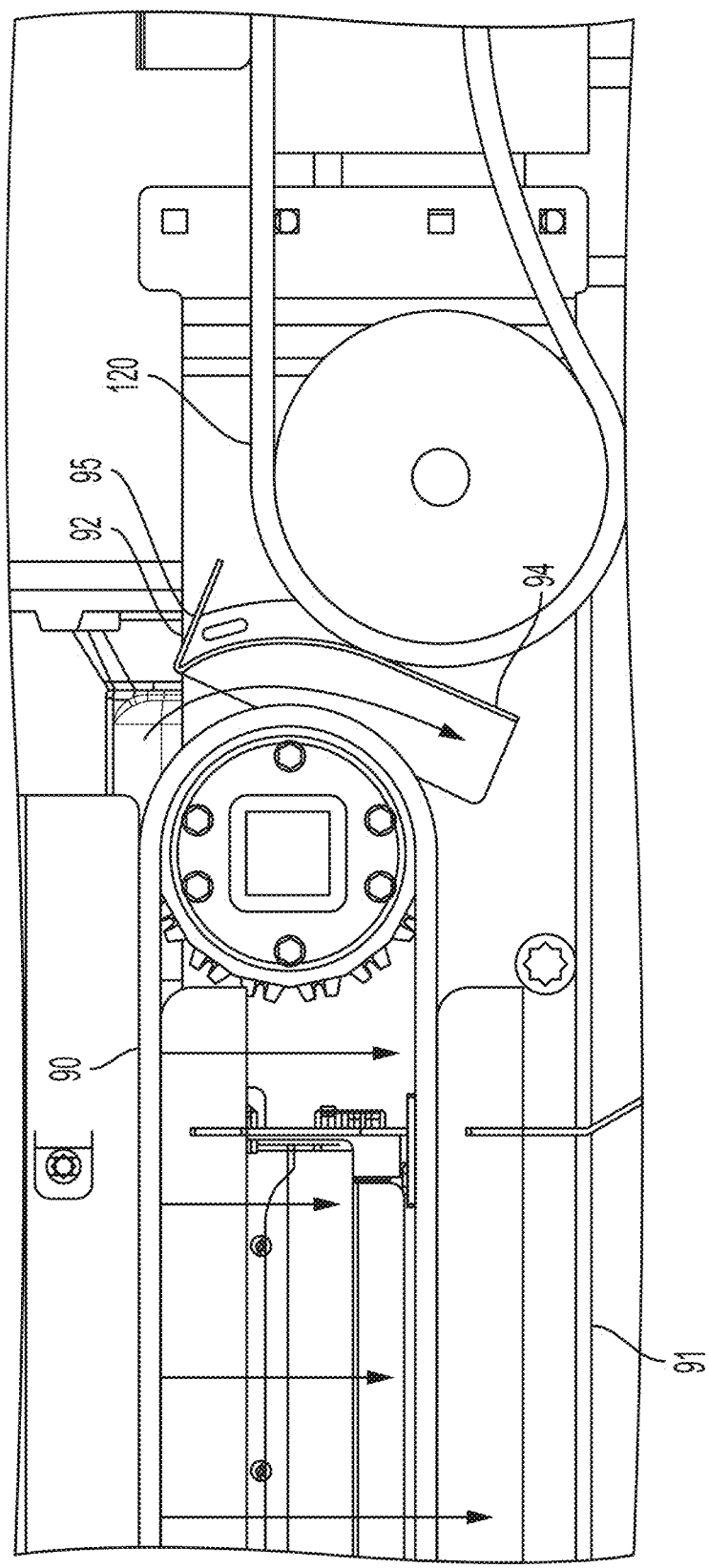
FIG. 18 is a side view of a dewatering belt and water trap in the system of FIG. 1.

In the illustrative embodiment, each flume 70 discharges separated shrimp (or other singulated product) onto a dewatering conveyor. Separated, singulated product is conveyed on the dewatering conveyor in several lanes. Referring to FIG. 18, the dewatering conveyor 90 comprises a perforated belt designed to drain water from the product into a tank 91 or other suitable container. The drained water can be recycled back to a water source feeding the water nozzle 80. In addition, the dewatering conveyor 90 includes a water trap 92 at an outfeed end of the dewatering conveyor for deflecting water into the tank 91. The water trap 92 directs water carried with shrimp discharged from the dewatering conveyor 90 into the tank 91. The water trap 92 comprises a curved sheet 94 spaced from the outfeed end of the dewatering belt and separating the outfeed end of the dewatering belt 90 from the infeed end of a processing conveyor 120. The water trap 92 further comprises a slanting cover sheet 95 forming a bridge between the outfeed end of the dewatering belt 90 and the processing conveyor 120. In one embodiment, the water trap 92 can be adjusted up and down for optimization.

The system can further include a whisker trap for removing detached whiskers from the flow, which may become trapped by the cover 95. The whisker trap can include a nozzle at the outlet of the dewatering conveyor. The nozzle directs water or another fluid over the cover, in directions perpendicular to the direction of belt travel. A whisker holder below the belt outfeed may hold whiskers released from the cover.

Singulated, separated and dewatered product then passes onto a processing conveyor 120, which is positioned below the outfeed of the dewatering conveyor 90 to catch product dispatched from the dewatering conveyor.

Although the separation and singulation system has been described in detail with reference to a few versions, other versions are possible. The scope of the claims is not meant to be limited to the details of the exemplary versions.

What is claimed is:

1. An apparatus for singulating a batch of a product comprising:
   a conveyor for conveying the product;
   a divider pan positioned below an outfeed end of the conveyor for receiving the product and dividing the product into a plurality of lanes of product;
   a plurality of flumes positioned to receive the plurality of lanes of product, wherein the flumes provide a flow of water to accelerate the product to separate and singulate the product; and
   a dewatering conveyor for receiving separated product from the plurality of flumes and draining water from the separated product.

2. The apparatus of claim 1, wherein each flume comprises a channel with a water nozzle forming a back wall of the channel providing a fluid to carry the product.

3. The apparatus of claim 1, wherein each flume comprises:
   an upper flume for receiving the product,
   a middle flume for directing product received from the upper flume to a first side,
   a lower flume for directing product from the middle flume to a second side, and
   a narrowing slide for receiving product from the lower flume and accelerating the product.

4. The apparatus of claim 3, wherein the upper flume comprises a flat bottom wall, angled lower side walls that flare out and up and vertical upper side walls.

5. The apparatus of claim 4, wherein the middle flume comprises vertical upper side walls that are wider than the vertical upper side walls of the upper flume, a curved, concave wall and an angled side wall that intersects the curved, concave side wall to define a nadir that is laterally shifted relative to a nadir of the upper flume.

6. The apparatus of claim 3, wherein the lower flume comprises vertical upper side walls that are wider than the vertical upper side walls of the middle flume, a curved, concave wall and an angled side wall that intersects the curved, concave side wall to define a nadir that is laterally shifted relative to a nadir of the middle flume.

7. The apparatus of claim 3, wherein the tapering slide comprises:
   a wide upper section having a convex bottom wall, a first side wall that is substantially straight and a second side wall that tapers from an outer point aligned with an outer wall of the lower flume;
   a narrowing middle section comprising a downwards angled bottom wall, third side wall aligned with the first side wall and a fourth side wall that tapers to narrow the channel formed by the flume.

8. The apparatus of claim 7, wherein the tapering slide further comprises a bottom section having a convex bottom wall and parallel, vertical sides.

9. The apparatus of claim 1, further comprising a shaker pan positioned to receive product from the divider pan, wherein the shaker pan agitates the product to break apart any clumps of product before passing the product to the plurality of flumes.

10. The apparatus of claim 1, wherein the divider pan comprises:
    an angled back wall;
    a plurality of upper dividing walls on the angled back wall forming upper channels; and
    a plurality of lower dividing walls below the upper dividing walls forming lower channels.

11. The apparatus of claim 10, wherein two of the angled lower dividing walls form an A-frame divider having a peak that extends into an end of an upper channel.

12. An apparatus for singulating a batch of a product comprising:
    a conveyor for conveying the product;
    a divider pan positioned below an outfeed end of the conveyor for receiving the product and dividing the product into a plurality of lanes of product, the divider pan comprising
    an angled back wall;
    a plurality of upper dividing walls on the angled back wall forming upper channels; and
    a plurality of lower dividing walls below the upper dividing walls forming lower channels; and
    a plurality of flumes positioned to receive the plurality of lanes of product, wherein the flumes accelerate the product to separate and singulate the product.

13. The apparatus of claim 12, wherein two of the angled lower dividing walls form an A-frame divider having a peak that extends into an end of an upper channel.

14. The apparatus of claim 12, wherein each flume comprises a channel with a water nozzle forming a back wall of the channel providing a fluid to carry the product.

15. An apparatus for singulating a batch of a product comprising:
    a conveyor for conveying the product;
    a divider pan positioned below an outfeed end of the conveyor for receiving the product and dividing the product into a plurality of lanes of product; and
    a plurality of flumes positioned to receive the plurality of lanes of product, each flume comprising a first channel extending downwards and having a water nozzle forming a back wall of the first channel providing a fluid to carry the product.

16. The apparatus of claim 15, wherein each flume comprises a plurality of offset channels.

17. The apparatus of claim 15, wherein a nozzle comprises a base that forms a back wall of the first channel, a tail portion for connecting the nozzle to the flume and a thickened upper portion having a bottom edge that matches the profile of the first channel.

18. The apparatus of claim 17, further comprising a water opening connected to a water source and a lip extending partially into the first channel for directing water provided through the water opening.

19. An apparatus for singulating a batch of a product comprising:
    a conveyor for conveying the product;
    a divider pan positioned below an outfeed end of the conveyor for receiving the product and dividing the product into a plurality of lanes of product; and
    a plurality of flumes positioned to receive the plurality of lanes of product, wherein the flumes provide a flow of water to accelerate the product to separate and singulate the product, wherein each flume comprises an upper flume for receiving the product, a middle flume for directing product received from the upper flume to a first side, a lower flume for directing product from the middle flume to a second side, and a narrowing slide for receiving product from the lower flume and accelerating the product.

* * * * *